United States Patent [19]
May et al.

[11] Patent Number: 5,375,202
[45] Date of Patent: Dec. 20, 1994

[54] DISPATCHING AND SCHEDULING MEMORY OPERATIONS IN AN ELECTRONIC PRINTING SYSTEM

[75] Inventors: Keith A. May, Palmyra; Colleen R. Enzien, Penfield; Randall J. Stegbauer, Ontario; Christopher Comparetta, Pittsford; Anthony M. Federico, Webster; Ronald A. Ippolito, Rochester; Ernest Legg, Fairport; Kitty Sathi, Pittsford, all of N.Y.

[73] Assignee: Xerox Corporation, Stamford, Conn.

[21] Appl. No.: 366

[22] Filed: Jan. 4, 1993

[51] Int. Cl.$^5$ .............................................. G06F 13/00
[52] U.S. Cl. ................................................... 395/164
[58] Field of Search ............................ 364/143, 242.2; 395/275, 425, 600, 200, 375, 575, 775, 800, 164

[56] References Cited

U.S. PATENT DOCUMENTS

| | | | |
|---|---|---|---|
| 4,947,345 | 8/1990 | Paradise et al. | 364/242.2 |
| 5,142,667 | 8/1992 | Dimperio et al. | 395/115 |
| 5,155,845 | 10/1992 | Beal et al. | 395/575 |
| 5,170,340 | 12/1992 | Prokop et al. | 364/143 |
| 5,220,653 | 6/1993 | Miro | 395/275 |
| 5,241,672 | 8/1993 | Slomcenski et al. | 395/600 |
| 5,249,279 | 9/1993 | Schmenk et al. | 395/425 |

*Primary Examiner*—Mark R. Powell
*Assistant Examiner*—U. J. Chauhan
*Attorney, Agent, or Firm*—Gary B. Cohen

[57] ABSTRACT

In accordance with the present invention there is provided a method for scheduling transfers in a printing machine of the type having a scheduler communicating with both a first disk and a second disk, the first and second disks having a combined bandwidth. The method for scheduling comprises the following steps: First, a first transfer to be performed on a first location of the first disk during a first time interval and a second transfer to be performed on a second location of the first disk during a second time interval are both scheduled, with the scheduler, so that a first time gap interval exists between the first time interval and the second time interval. Second, a third transfer to be performed on a first location of the second disk during a third time interval and a fourth transfer to be performed on a second location of the second disk during a fourth time interval are both scheduled, with the scheduler, so that a second time gap interval exists between the third time interval and the fourth time interval. Finally, a fifth transfer to be performed during a fifth interval is scheduled, with the scheduler, so that the fifth interval occurs during either the first time gap interval or the second time gap interval in a manner that maximizes the combined bandwidth of the first and second disks.

10 Claims, 14 Drawing Sheets

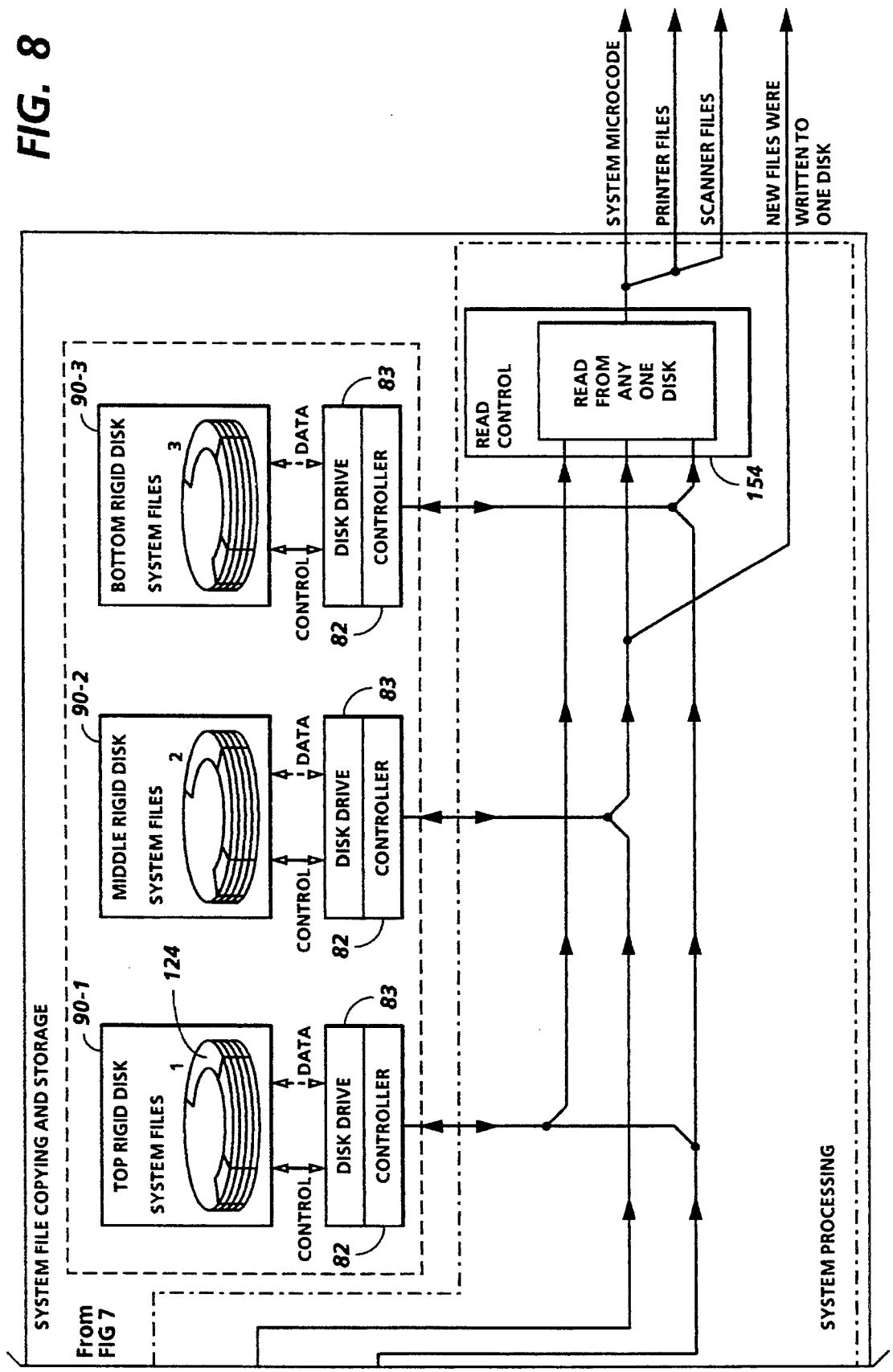

DISPATCHING AND SCHEDULING MEMORY OPERATIONS IN AN ELECTRONIC PRINTING SYSTEM

The present invention relates generally to resource management of a memory arrangement in an electronic printing system and, more specifically, to a technique for dispatching and scheduling transfers in the memory arrangement.

In an electronic printer, of the type known is DocuTech® and manufactured by Xerox® Corporation, various components ("clients"), such as a marking engine, are linked to a main memory by way of a system memory. In the preferred embodiment the main memory preferably comprises a plurality of hard disks. The use of a plurality of hard disks to store redundant files is disclosed in the following patent:

U.S. Pat. No. 5,155,845 Patentees: Beal et al. Issued: Oct. 13, 1992.

For the above-mentioned electronic printer, files are transferred between the clients and the main memory through use of a resource manager, which resource manager schedules access to the disks for the clients. The data to be transferred to the disks is held in the system memory, the system memory being managed as a chain of buffers by the resource manager. To achieve such management, buffers assigned to specific clients are handed to the resource manager and then written to the main memory whenever bandwidth is available. Since each seek of the disks incurs a seek overhead, the number of seeks is minimized by chaining buffers together and transferring the chained buffers between a client and one of the disks in a single operation. For example, resource manager can link together buffers that are to be written to contiguous locations on one or more disks, the writing being responsive to attaining a preset threshold. Further information regarding an implementation of resource management can be obtained by reference to the following patent:

U.S. Pat. No. 5,142,667 Patentee: Dimperio et al. Issued: Aug. 25, 1992.

The pertinent portions of U.S. Pat. No. 5,142,667 are incorporated herein by reference.

In the DocuTech® system, files are preferably stored in one of two configurations: "replicated" files which have a copy on each disk, and "superdisk" files, segments of which are "striped" across each disk. A detailed description of these file configurations and the manner in which they are stored on the disks can be obtained by reference to the following:

U.S. patent application Ser. No. 07/678,926 Title: File Storage Process for Electronic Printing Systems having Multiple Disks Filed: Apr. 1, 1991.

The pertinent portions of U.S. patent application Ser. No. 07/678,926 are incorporated herein by reference.

In a multi-function system with one or more disks, such as DocuTech®, throughput becomes a "bottleneck" resulting in skipped pitches, and thus delays in printing. In a "print shop" environment, such delays are unacceptable. For disk I/O a replicated file transfer is $1/N$ times that of a superdisk file transfer rate, where N is equal to the number of disks in the superdisk. That is, when a client requests a read of a replicated file only one disk is involved in the resulting data transfer and $(N-1)/N$ of the available disk bandwidth is not utilized. In the print shop environment it is essential that maximum disk utilization be achieved so that disk bandwidth is maximized. Accordingly transfer operations should be performed for all of disks, in parallel, on an on-going basis. While U.S. patent application Ser. No. 07/678,926 suggests that files can be written to or read from the disks in parallel, it does not disclose a process for achieving such end. Moreover, while U.S. Pat. No. 5,142,667 discloses a desirable scheduling approach for a resource management scheme, such approach does not necessarily insure that a plurality of disks will be kept as busy as possible or that combined bandwidth will be maximized. It would be desirable to provide a process which optimizes transfers of files between various clients and a plurality of disks so that the combined bandwidth of the plurality of the disks is maximized.

In accordance with the present invention there is provided a printing machine for printing image data from one of a plurality of image files. The image files are associated with transfers, respectively, and the transfers are designated by sets of parameters, respectively. The printing machine comprises: an image input terminal for providing the plurality of image files; a system memory, communicating with said image input terminal, being adapted to store selected image data temporarily and the sets of parameters; a plurality of disk drive devices having a combined bandwidth upon which the image data of the image files can be stored with each of said plurality of disk drive devices communicating with said system memory; and a resource manager for controlling and scheduling transfers of image data between said system memory and each of said plurality of disk drive devices with the sets of parameters in a manner which maximizes the combined bandwidth of said plurality of disk drive devices.

In accordance with another aspect of the present invention there is provided a method for scheduling transfers in a printing machine of the type having a scheduler communicating with both a first disk and a second disk, the first and second disks having a combined bandwidth. The method for scheduling comprises the steps of: scheduling, with the scheduler, a first transfer to be performed on a first location of the first disk during a first time interval and a second transfer to be performed on a second location of the first disk during a second time interval so that a first time gap interval exists between the first time interval and the second time interval; scheduling, with the scheduler, a third transfer to be performed on a first location of the second disk during a third time interval and a fourth transfer to be performed on a second location of the second disk during a fourth time interval so that a second time gap interval exists between the third time interval and the fourth time interval; and scheduling, with the scheduler, a fifth transfer to be performed during a fifth interval, the fifth interval occurring during a selected one of the first time gap interval and the second time gap interval in a manner that maximizes the combined bandwidth of the first and second disks.

In accordance with yet another aspect of the present invention there is provided a method for processing a file of data in an electroreprographic machine of the type having an input/output device communicating with a selected one of a plurality of disks. Each file has a set of parameters designating a transfer to be performed with the file and a selected one of the plurality of disks. Additionally, each set of parameters is disposed in one of a plurality of disk queues. The method for processing a file comprises the steps of: selecting one of the sets of parameters from one of the disk queues for designating a transfer to be performed with a selected one of the plurality of disks; determining whether the designated transfer can be performed with a selected one of the disks; and dispatching the designated transfer to the selected one of the disks of said determining step when it is determined that the currently designated transfer can be performed therewith.

These and other aspects of the invention will become apparent from the following description, the description being used to illustrate a preferred embodiment of the invention when read in conjunction with the accompanying drawings.

Figure 2:
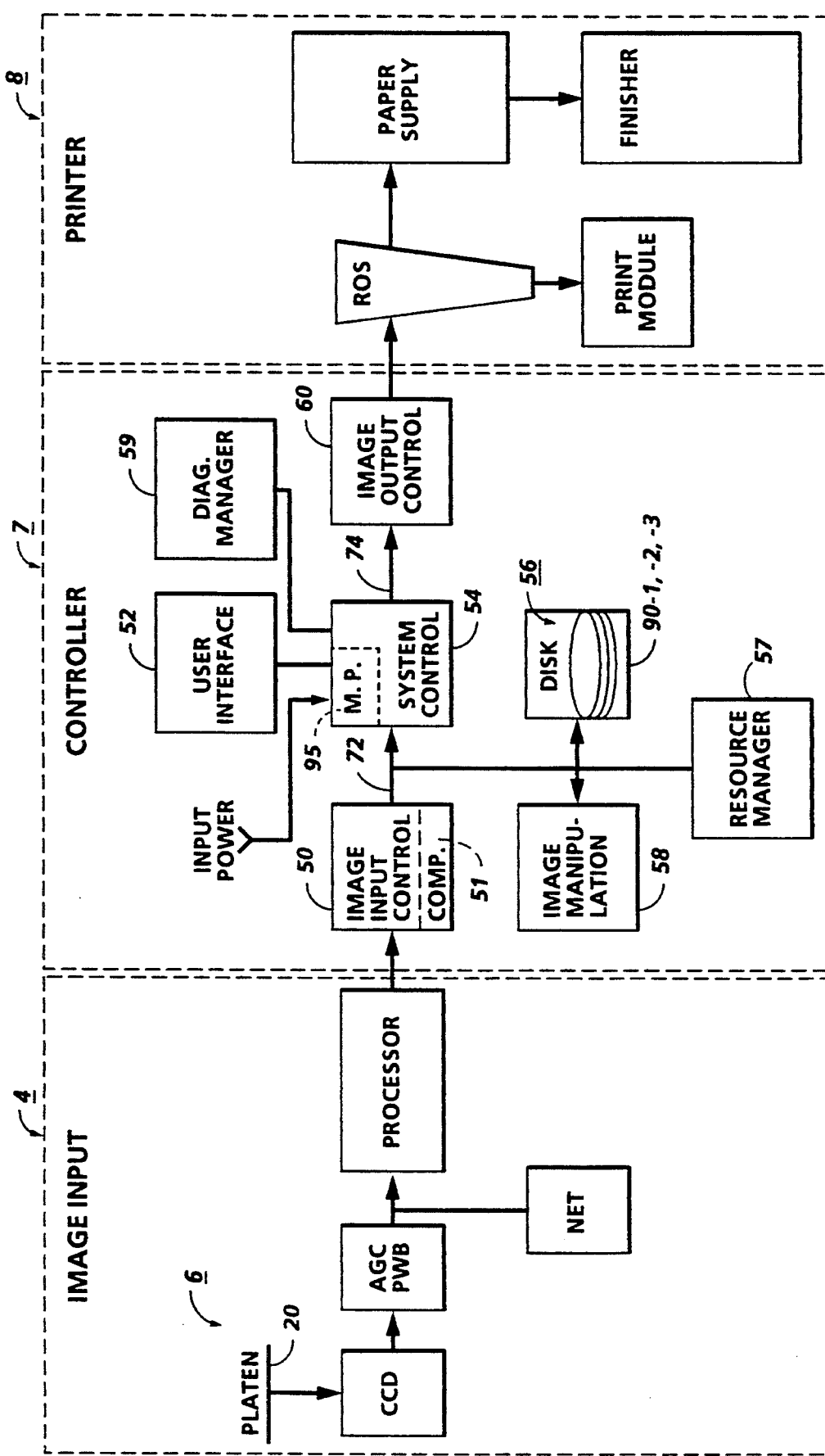
FIG. 2 is a block diagram of the electronic printing system of FIG. 1.
Figure 3:
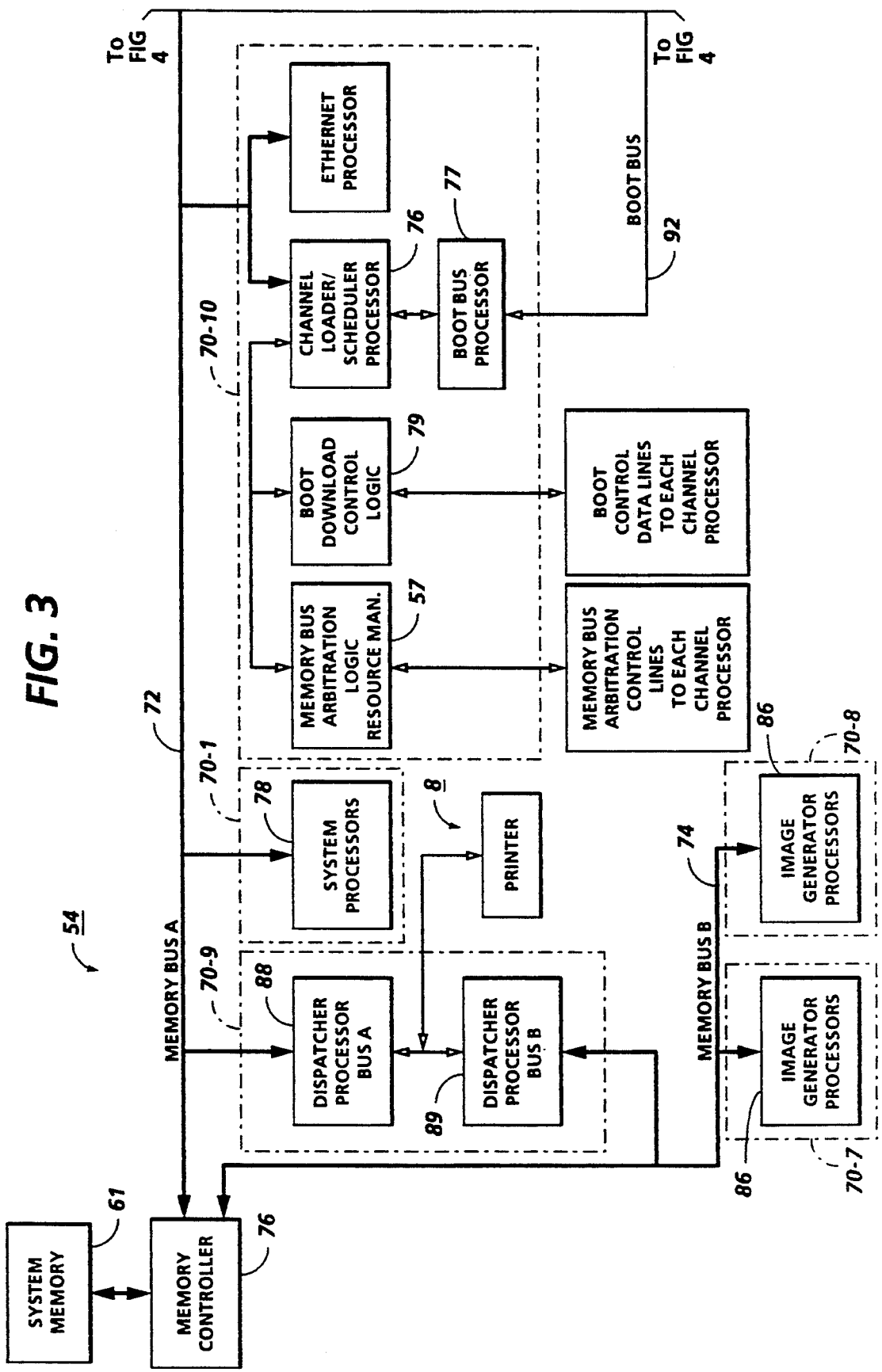
Figure 4:
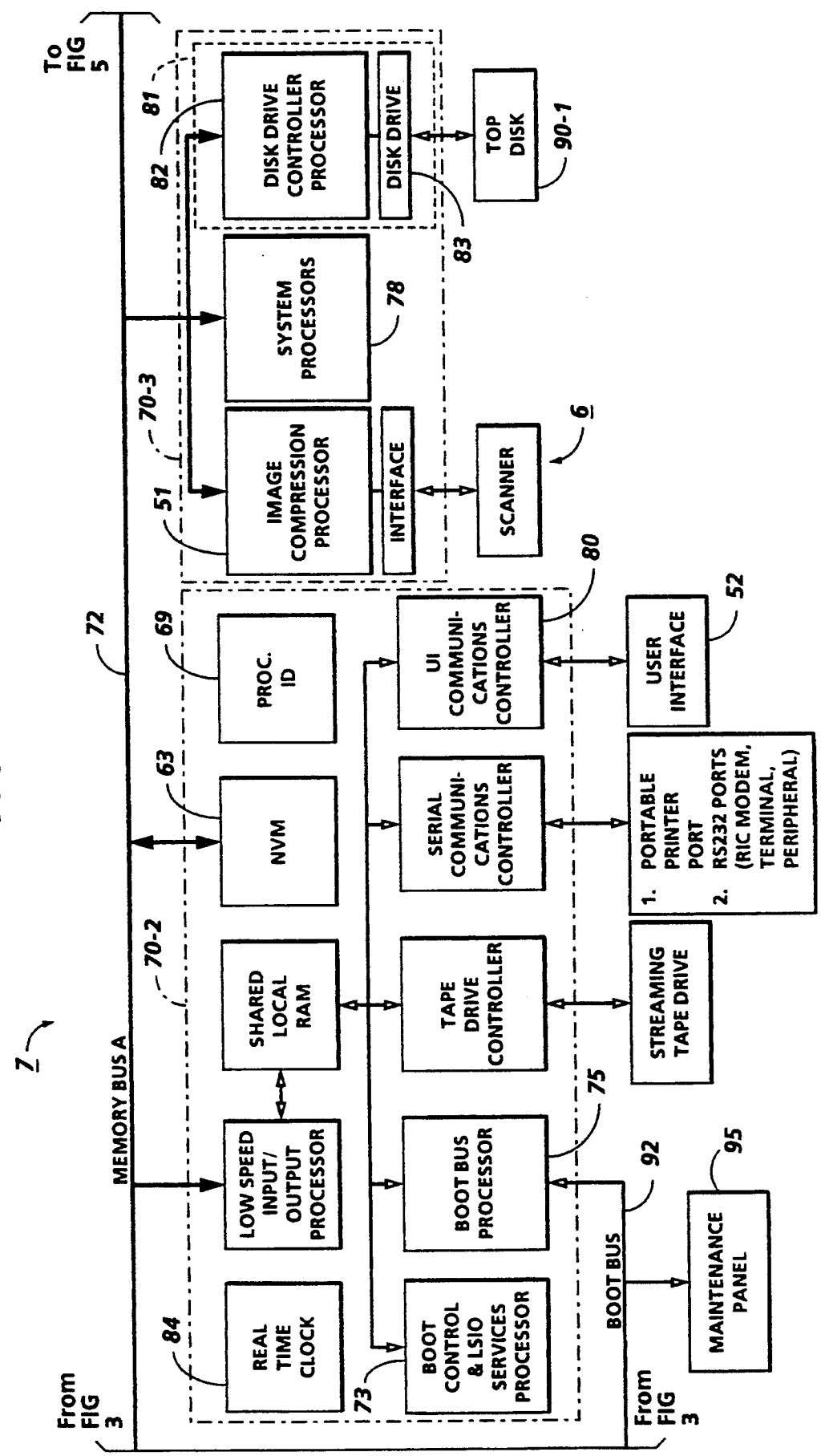
Figure 5:
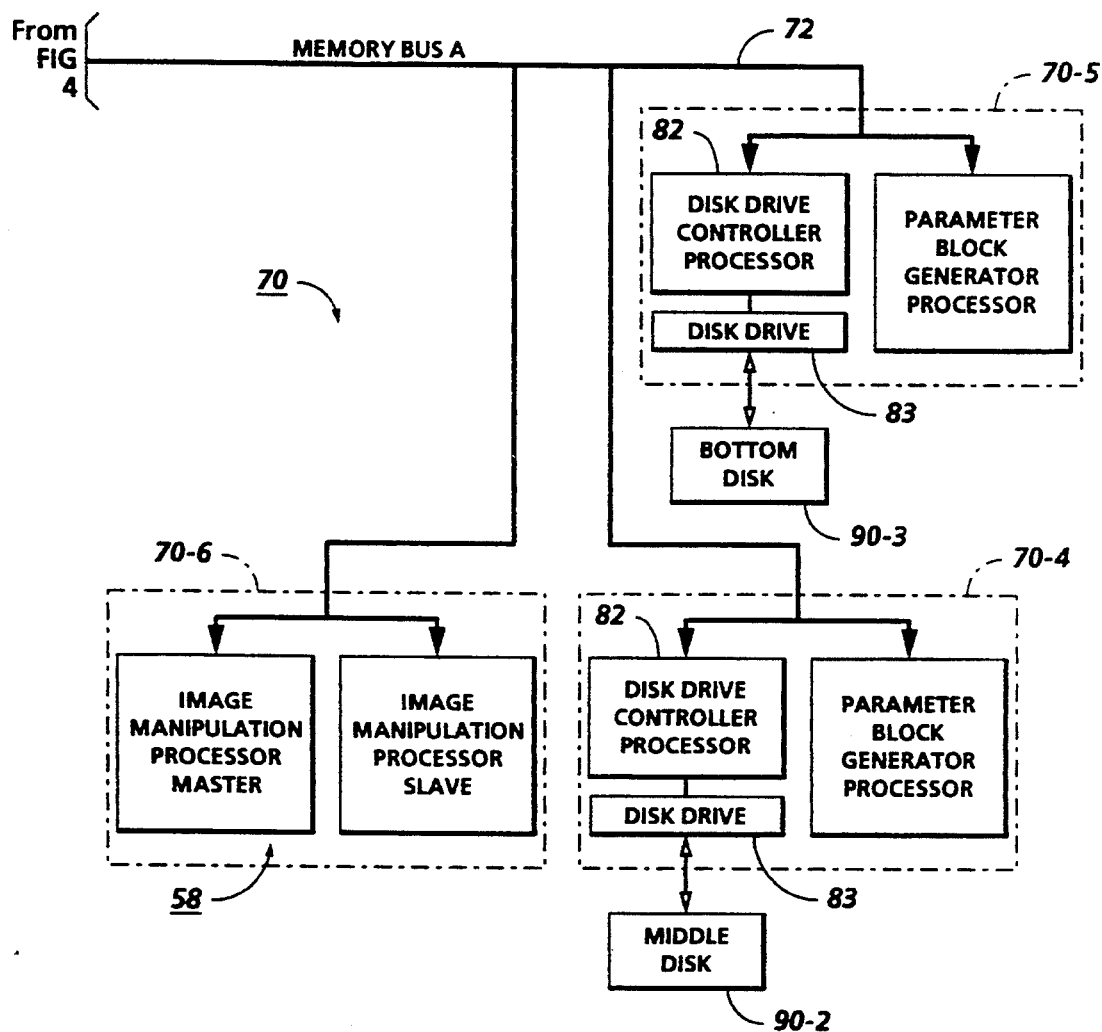
Figure 6:
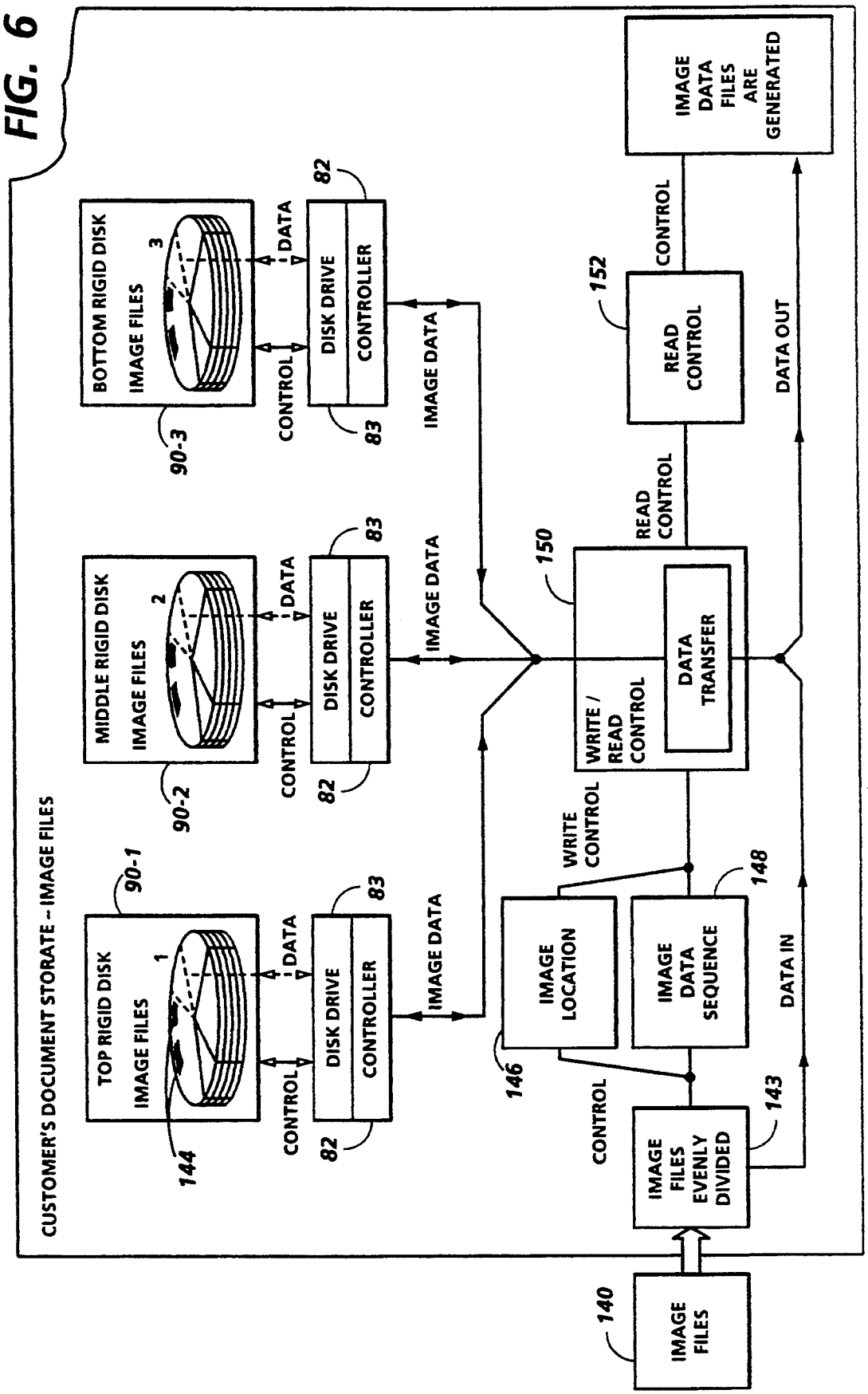
Figure 7:
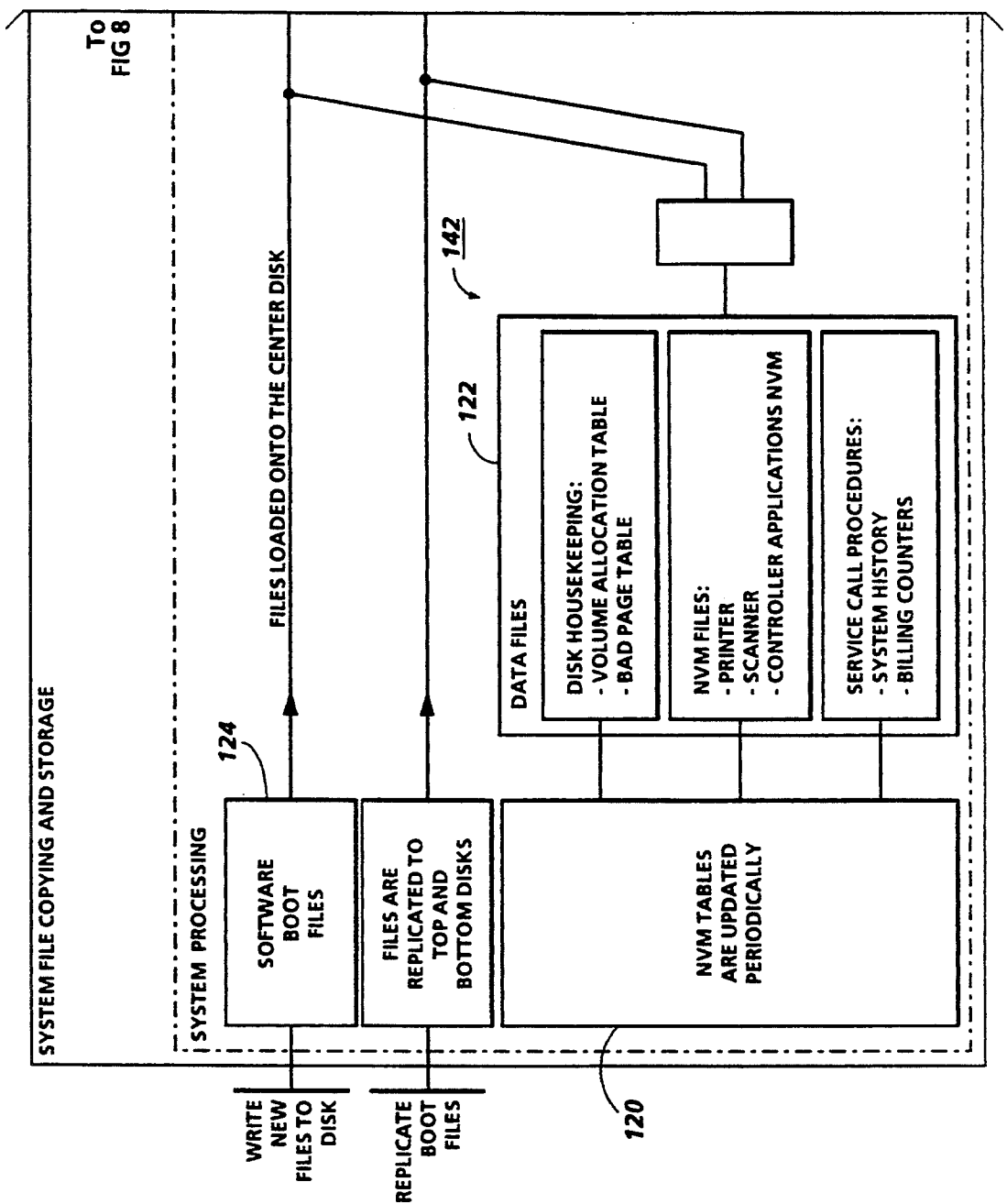
Figure 10:
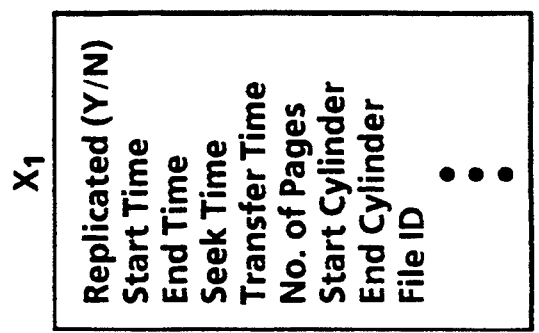
Figure 9:
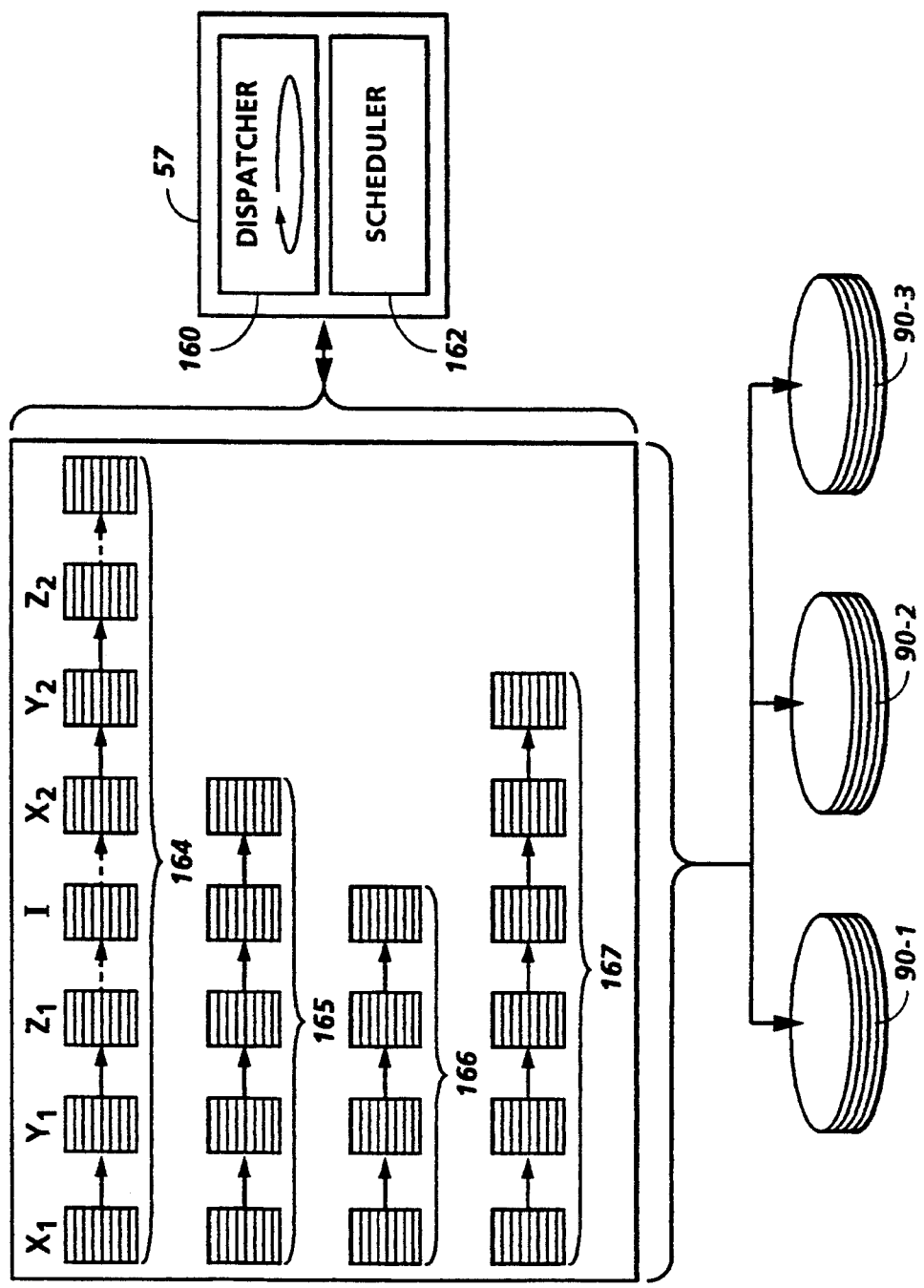
Figure 11:
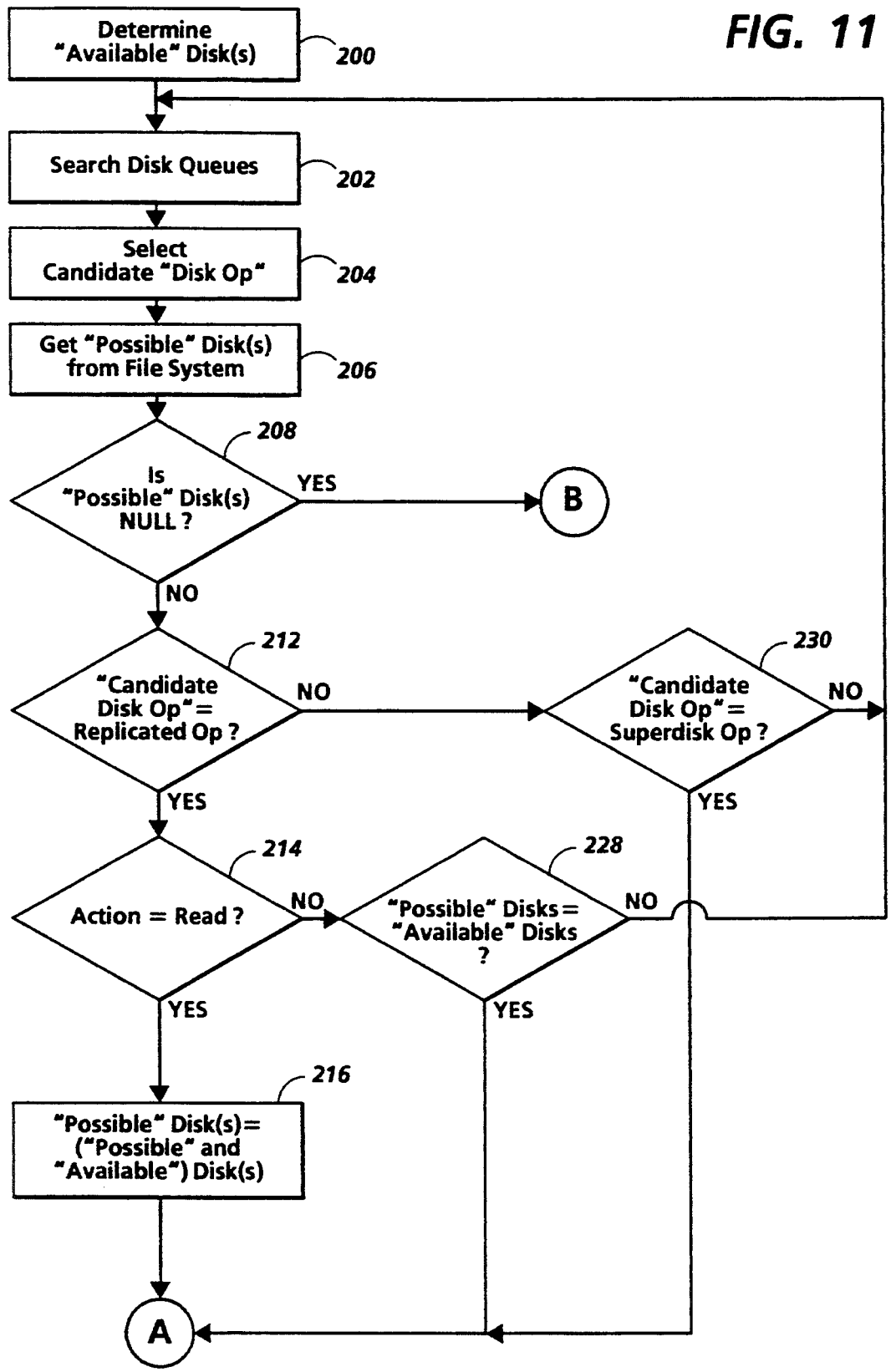
Figure 12:
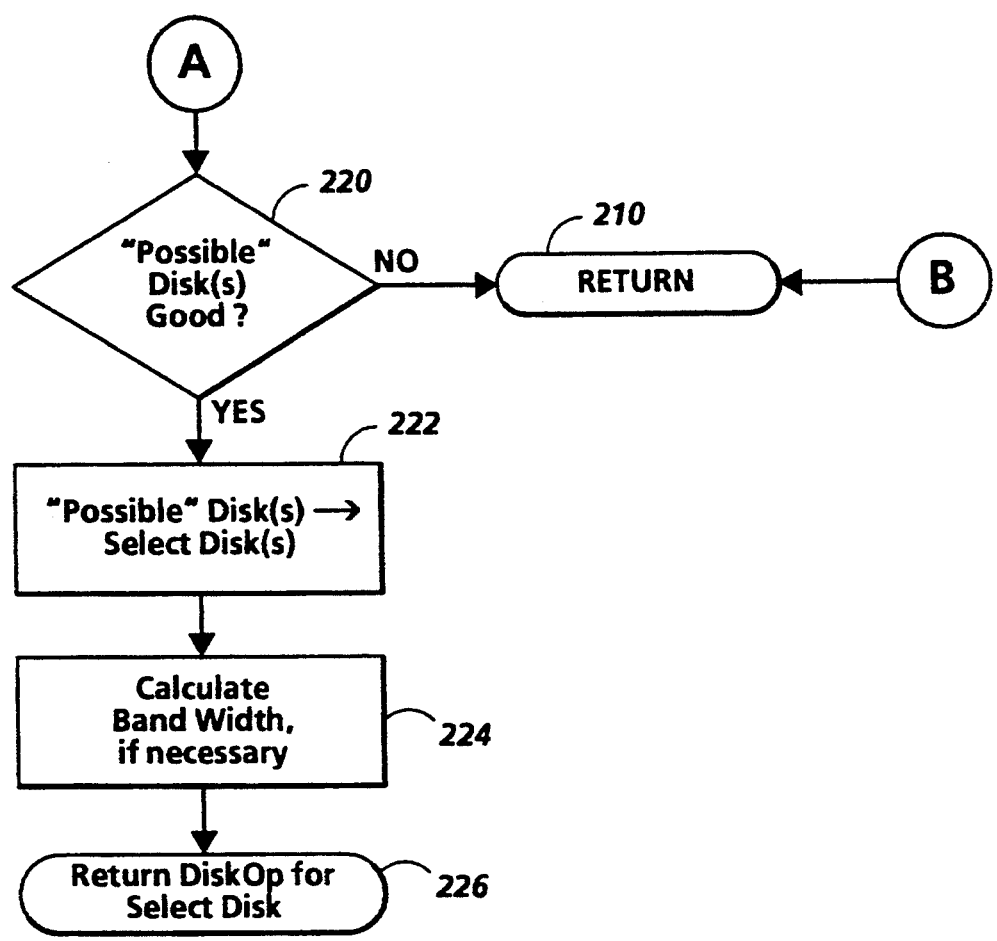
Figure 13:
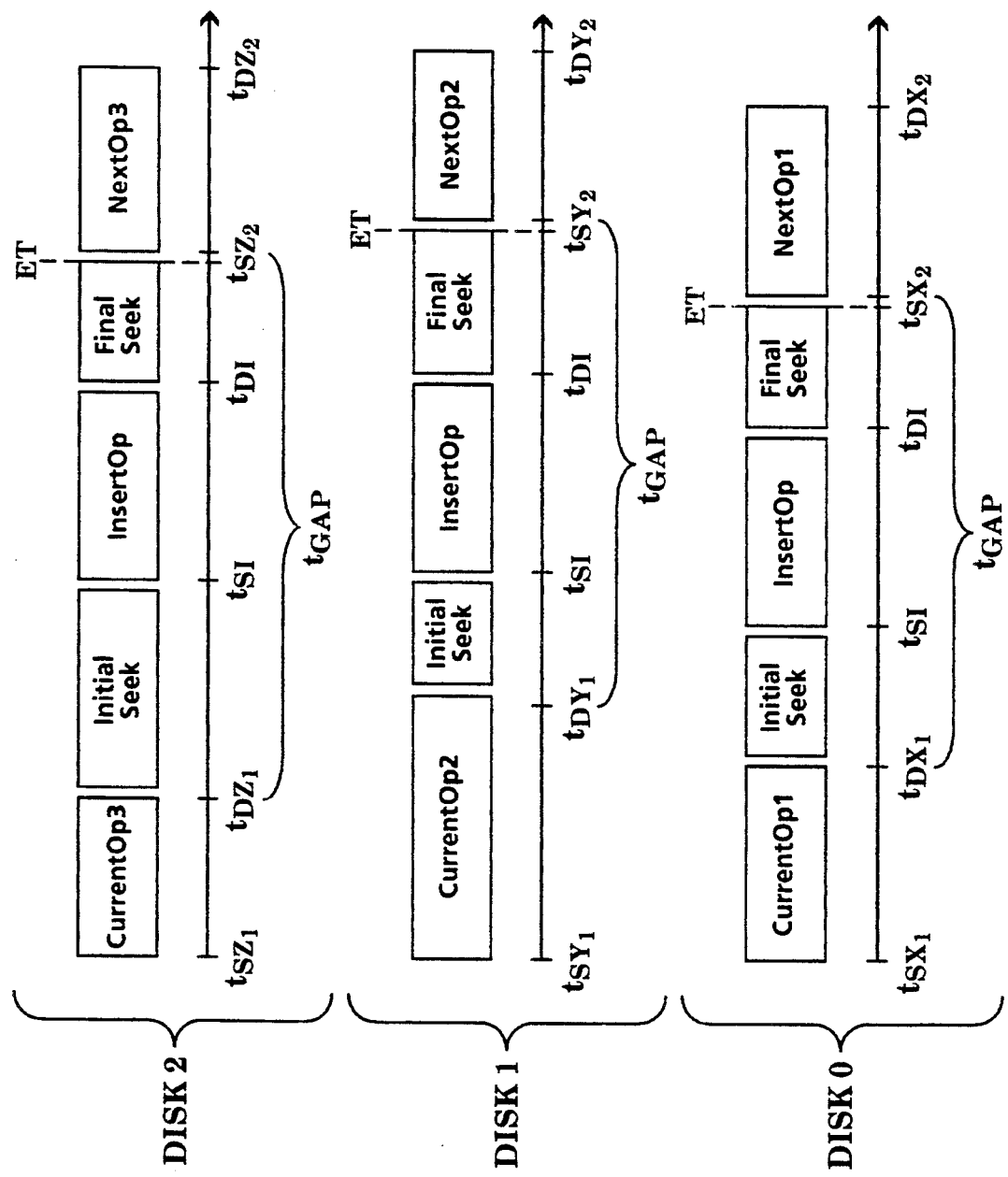
Figure 14:
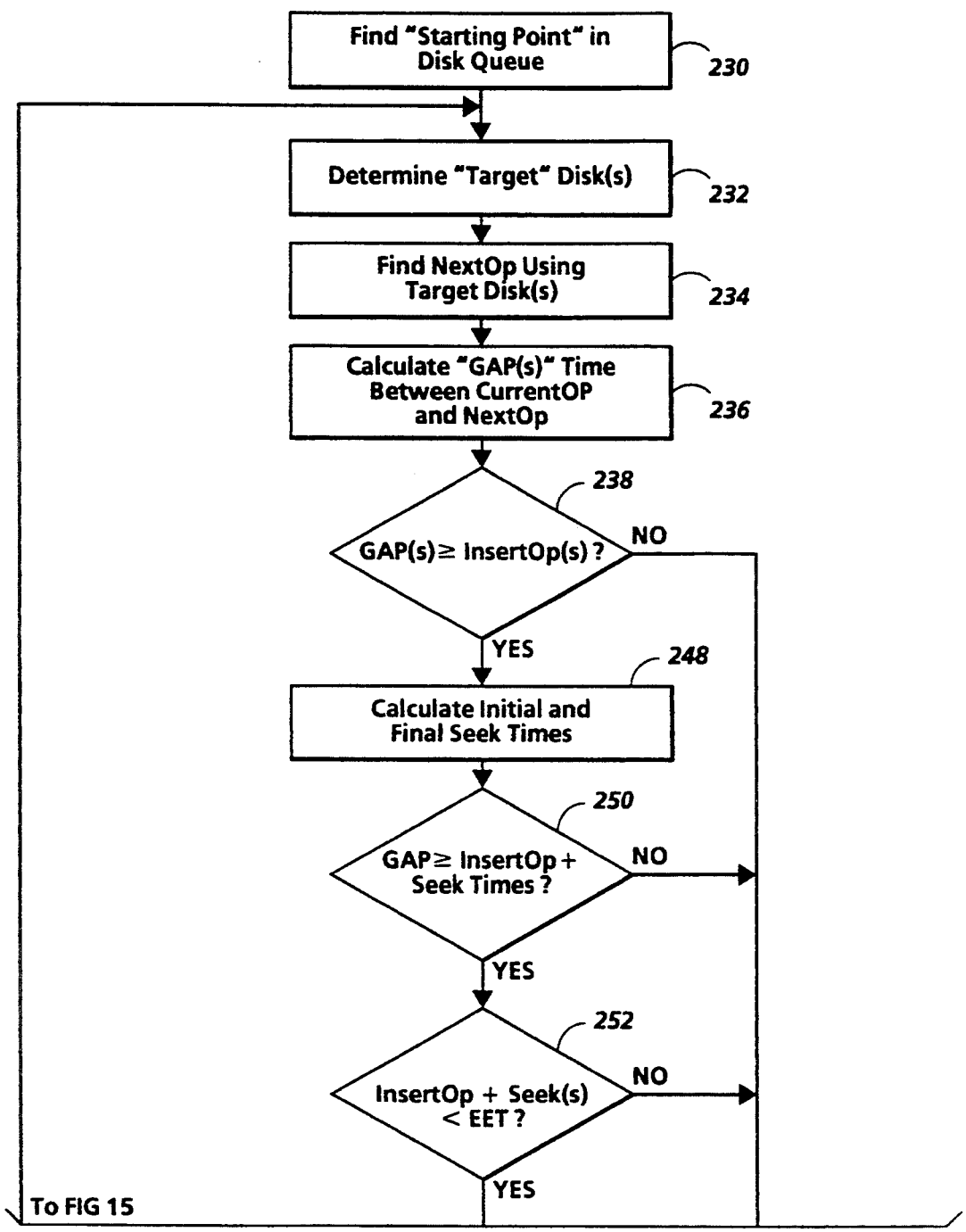
Figure 15:
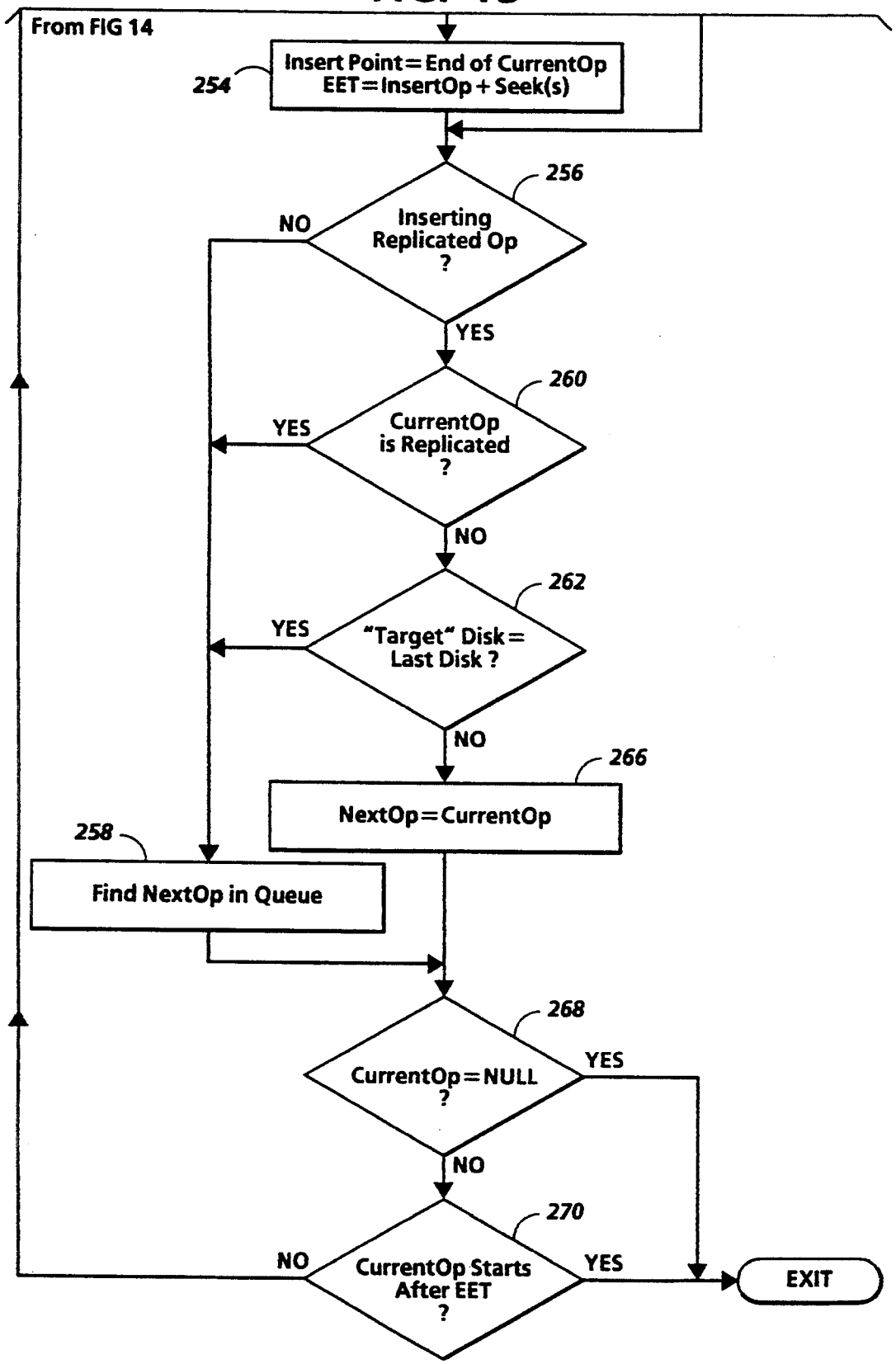

FIGS. 3–5 conjunctively represent a block diagram of the controller section of FIG. 2;

FIG. 6 is a block diagram depicting a technique for storing image files on the plurality of disk drive devices to provide super disk files;

FIGS. 7 and 8 conjunctively represent a block diagram depicting a technique for collecting system files and replicating them;

FIG. 9 is a schematic, block diagram of resource manager operatively coupled with both a plurality of disk drive devices and a system memory, the system memory including a plurality of sets of parameters;

FIG. 10 is a schematic, enlarged view of one of the sets of parameters shown in FIG. 9;

FIGS. 11 and 12 conjunctively represent a flow diagram depicting the operation of a dispatcher of FIG. 9;

FIG. 13 is a schematic representation of various transfer or operations as scheduled on the plurality of disk drive devices; and FIGS. 14 and 15 conjunctively represent a flow diagram for the operation of the scheduler of FIG. 9.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
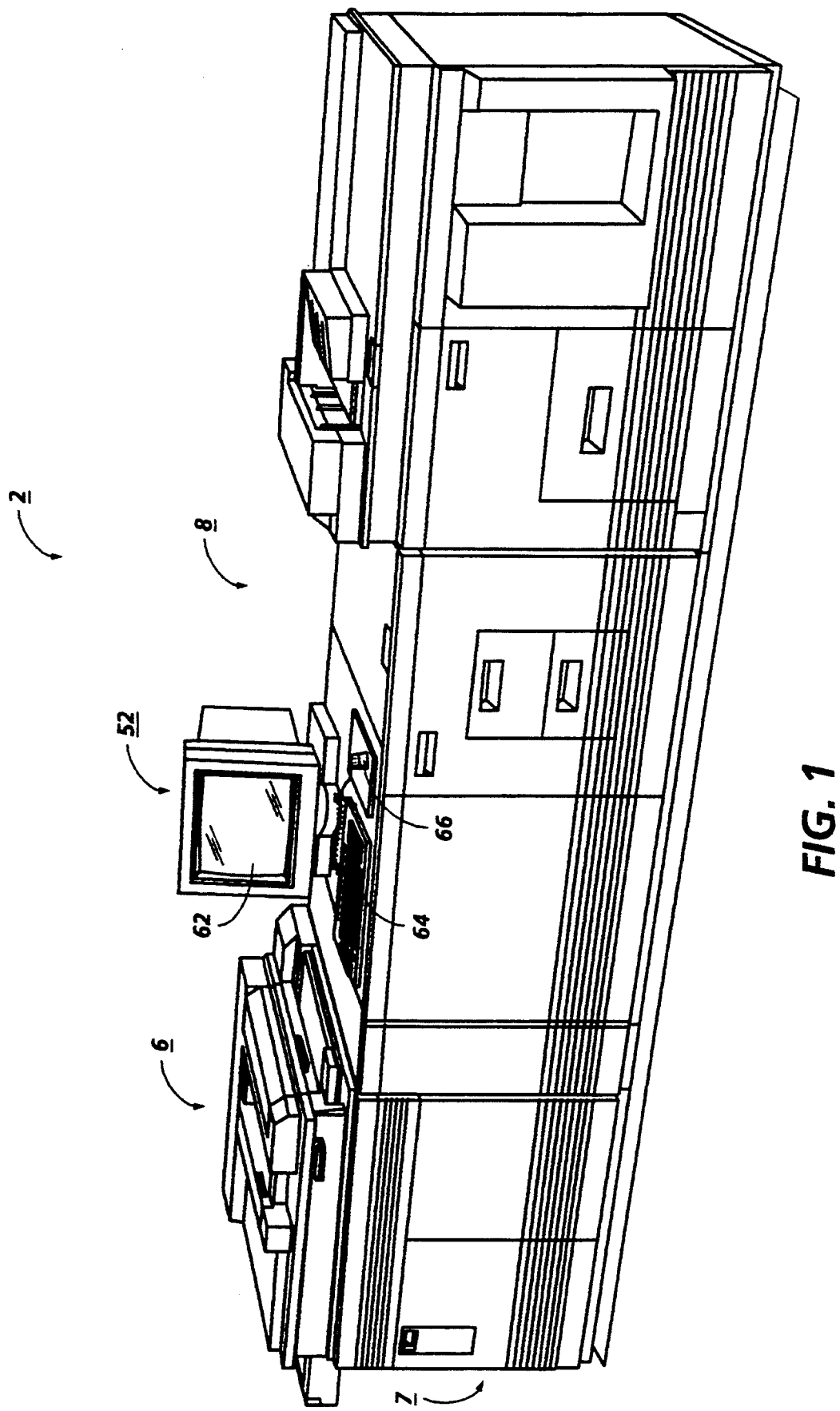
FIG. 1 is a perspective view of an electronic printing system upon which a technique of the present invention can be executed.

Referring to drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and furthermore may be incorporated in electronic display systems, such as CRTs, LCDs, LEDs, etc. or else other image scanning/processing/recording systems, or else other signal transmitting/receiving, recording systems, etc. as well.

A more detailed description of printing system 2 may be found in copending U.S. patent application Ser. No. 07/620,519, filed Nov. 30, 1990, to James R. Graves et al, and entitled "System for Scanning Signature Pages", the disclosure of which is incorporated by reference herein.

Referring to FIG. 2, controller section 7 is, for explanation purposes, divided into an image input controller 50, User Interface (UI) 52, system controller 54, disk memory 56, image manipulation section 58, Resource Manager 57, Diagnostic Manager 59, and image output controller 60.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, visual document facsimile display, programming information and icons, diagnostic information and pictorial views, etc. Items displayed on touchscreen 62 such as files and icons are actuated by either touching the displayed item on screen 62 with a finger or by using mouse 66 to point a cursor to the item selected and keying the mouse.

Referring to FIGS. 2–5, the scanned image data input from scanner section 6 to controller section 7 is compressed by image compressor/processor 51 of image input controller 50 on PWB 70-3. The compressed image data with related image descriptors are placed in image files and temporarily stored in system memory 61 pending transfer to main memory 56 where the data is held pending use. A preferred procedure for storing image files is discussed below.

When the compressed image data in memory 56 requires further processing, or is required for display on touchscreen 62 of UI 52, or is required by printer section 8, the data is accessed in memory 56 and transferred to system memory 61. Where further processing other than that provided by processor of image input section 4 is required, the data is transferred to image manipulation section 58 on PWB 70-6 where additional processing steps such as collation, make ready (document editing), decomposition, rotation, etc. are carried out. Following processing, the data may be returned to main memory 56, sent to UI 52 for display on touchscreen 62, or sent to image output controller 60.

Resource Manager 57 controls access to disks and RAM 61 of files while diagnostic manager 59 handles system faults.

Image data output to image output controller 60 is decompressed and readied for printing and output to printer section 8. Image data sent to printer section 8 for printing is normally purged from memory 56 to make room for new image data.

As shown in FIGS. 3–5, controller section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural application or system processors 78; low speed I/O processor PWB 70-2 having UI communication controller 80 for transmitting data to and from UI 52, Boot Control & LSIO Services Processor 73, and Boot Bus Processor 75; PWBs 70-3, 70-4, 70-5 having disk drive controller/processors 82 with disk drives 83 for transmitting data to and from disks 90-1, 90-2, 90-3 respectively of main memory 56 (image compressor/processor 51 for compressing the image data and another application processor 78 are on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10 having Channel Loader/Scheduler Processor 76, Boot Bus Processor 77, Boot Download Control Logic 79, and Memory Bus Arbitration Logic/Resource Manager 57. Loader/Scheduler Processor 76 has two functions, one as a Boot channel to bring the system to the ready state and the other as a scheduler channel used to decide which channel performs which task and in which sequence the tasks will be performed.

Each independent processor and associated circuitry form a channel 81. Channels 81 (an example is shown in FIG. 4) are independent processors for handling the applications software, or input/output processors for handling peripheral devices such as disk drives. For example, there are disk channels used to interface disk drives 83 for disks 90-1, 90-2, 90-3, scanner interface channel, printer interface channel, etc.

Main memory 56 has plural hard disks 90-1, 90-2, 90-3 on which image files 140 and system files 142 are stored. For ease of discussion, the disks 90-1, 90-2 and 90-3 may be referred to simply as "disks 90". System files comprise system operating files such as boot files 124, software files, data files 122, font-related files, etc., while image files are, in one example, files of scanned image data. System files are viewed as critical because of their importance to the operation of the system while image files are viewed as non-critical since these files may be re-captured by re-scanning the source document.

System memory 61, which comprises a Random Access Memory or RAM, serves as a temporary store for data required during system operations. Memory 61 stores bits of data which can be written to (Data Entered) or read from (Data Used) the memory. Other data in memory 61 is used for reference and remains loaded as long as power is supplied. Since memory 61 is volatile, that is, all data is lost when power to memory 61 is terminated, Non Volatile Memory or NVM, which essentially comprise RAM memory with battery backup to supply DC voltage when power is turned off, are provided at several locations in the system as, for example, NVM 63 on Low Speed I/O Processor PWB 70-2 (FIG. 4). NVM 63 is used to store file management updates and file content updates.

Copending U.S. patent application Ser. No. 07/590,634, filed Sep. 28, 1990, to George L. Eldridge, and entitled "Method of Operating Disk Drives in Parallel", the disclosure of which is incorporated by reference herein, describes what will be referred to herein as Super Disk. Super Disk allows faster read/write access to files since all disks 90-1, 90-2, 90-3 can be accessed simultaneously. The risk incurred in this type of arrangement, however, is the loss of parts of a file should one or more of the disks fail which effectively results in loss of the entire file.

Referring to FIG. 6, to implement Super Disk, image files 140 to be transferred to disks 90-1, 90-2, 90-3 are divided by divider logic 143 into an even number of segments or sectors 144, each sector 144 being a preset number of bytes. The sectors are written in succession to successive disks until all of the sectors that comprise the image file are stored. Where N is equal to the number of disks, the total number of sectors 144 is an even multiple of N. In the example discussed, there are 3 disks 90-1, 90-2, 90-3 and therefore N=3. Accordingly, image files are divided into a plurality of sectors 144 which are in effect grouped into blocks of 3 sectors each. That is, sector 1 of image file 140 is written to disk 90-1, sector 2 to disk 90-2, sector 3 to disk 90-3, sector 4 to disk 90-1, sector 5 to disk 90-2, and so forth and so on. As will be understood, where the number of bytes in a file is not evenly divisible into sectors 144, one or more of the sectors 144 in the last block may be empty or partially empty of data. As a result, one larger storage media or super disk is effectively formed.

Image location logic 146 designates the location for each sector on disks 90-1, 90-2, 90-3, with the address of each corresponding block of sectors (i.e., sectors 1, 2, 3; sectors 4, 5, 6, etc) being the same. Image data sequence logic 148 controls the disk writing sequence, while write/read control logic 150 provides the actual instructions to write or read image data to or from disks 90-1, 90-2, 90-3. Image data read from disks 90-1, 90-2, 90-3 is reconstructed by read control logic 152 which reads the image file sectors back from disks 90-1, 90-2, 90-3 in the same manner as the data was written to disks 90-1, 90-2, 90-3.

Referring to FIGS. 7 and 8, system files 142 are normally permanent files which must be maintained. It should be recognized, however, that system files comprise other critical information, such as font-related information. To assure retention, system files 142 are replicated on each of the disks 90-1, 90-2, 90-3 at the same address. Replicated files are written simultaneously to all three disks 90-1, 90-2, 90-3, with the disk heads in the same position.

System files 142, whether updates 120 of data files 122 that occur periodically during operation and life of the system 2 or new files such as new or upgraded software entered as software boot files 124, are written to one disk, as for example center disk 90-2, through Disk Drive Control Processor 82 for disk 90-2. The system files are thereafter migrated to the other disks, in this case, top and bottom disks 90-1, 90-3. Read control 154 reads system files 142 from any one of the disks 90-1, 90-2, 90-3. For additional explanation, reference is had to copending U.S. patent application Ser. No. 07/678,925, entitled "A Process For Replacing storage Media In Electronic Printing Systems", filed Apr. 1, 1990, the pertinent portions of which are incorporated by reference herein.

As a result, both super disk files (i.e., image files 140 with segments distributed equally across disks 90-1, 90-2, 90-3 of the system) and replicated files (i.e., duplicate system files 142 with copies on the disks 90-1, 90-2, 90-3) are created. When super disk files are accessed, all disks 90-1, 90-2, 90-3 are busy retrieving/storing data from/to disks. When a copy of a replicated file is accessed for reading, only one disk is busy.

Referring to FIG. 9, the relationship between the resource manager 57, system memory 61 and the disks 90 is shown in further detail. The resource manager 57, which is shown as operatively coupled with the system memory 61, includes a dispatcher 160 and a scheduler 162, the operation of which dispatcher and scheduler will be discussed in further detail below. The various functions of the dispatcher and scheduler are performed with one or more processors.

Preferably, the system memory includes a plurality of disk queues 164-167, each of which queue includes one or more sets of parameters. For ease of discussion below, the sets of parameters in the disk queue 164 are designated with the letters $X_1$, $Y_1$, $Z_1$, I, $X_2$, $Y_2$ and $Z_2$, respectively. Each set of parameters, which is typically bundled and scheduled in time with one or two sets of parameters, corresponds to a file which is stored on one of the disks 90.

In the preferred embodiment, the queue 164 designates files which are reserved for printing with a marking engine of the printer 8. The queue 165 designates files of clients having guaranteed bandwidth in the printing system 2, the queue 166 designates files of clients having nonguaranteed bandwidth in the printing system 2, and queue 167 designates files in cache. Any of the files in the queues can comprise a replicated file or a super disk file.

Referring to FIG. 10, exemplary parameters of one of the sets of parameters are shown. These exemplary parameters are derived from one of three sources. First, information regarding the general nature of the file, i.e. whether it is replicated or super disk, along with corresponding start and end points on the disk(s) (i.e. "start cylinder" and "end cylinder"), is provided by use of a volume allocation table ("VAT"). Details regarding the implementation and operation of a preferred VAT is described in U.S. patent application Ser. No. 07/678,923, entitled "File Compaction Process for Electronic Printing System", filed Apr. 1, 1991, the pertinent portions of which are incorporated herein by reference.

Second, information regarding "start time" of a file transfer is supplied from one of the clients. Finally, since the resource manager 57 retains pertinent information regarding files stored on the disks and has access, from the clients, regarding the number of disk pages occupied by the file, it can calculate time intervals, such as the "seek time" associated with moving a disk head to a location on the disk at which the data of the file is disposed and the end time of the file transfer. Moreover, with information regarding the general nature of the file and the number of disk pages occupied by the file, the interval of the "transfer time" for the file can be determined readily.

Referring to FIGS. 9 and 11–12, the operation of the dispatcher 160 is described in further detail. At step 200, the dispatcher 160 determines "available" disk(s) and, at step 202, it searches the disk queues. Upon selecting a candidate operation from the queue, i.e. "DiskOp" (step 204), one or more "possible" disks upon which the DiskOp can be performed are determined, at step 206, by reference to a suitable VAT. Preferably, such suitable VAT is implemented in accordance with the description of U.S. patent application Ser. No. 07/678,923. At step 208, it is determined whether the the possible disks are null. That is, it is determined whether the disk or disks upon which the DiskOp can be performed are in some way faulty. If the possible disk(s) is null then a disk fault indication is provided at step 210; otherwise, the process proceeds.

If the DiskOp is a replicated operation ("ReplicatedOp") (step 212), then it is determined, via step 214, whether the ReplicatedOp is a read operation or a write operation. Provided the ReplicatedOp is a read operation, then, via step 216, a possible disk(s) is assigned to a disk(s) which is both "possible and available". Assuming that the possible disk assigned in step 216 is not null (step 220), then the possible disk is assigned to a "select" disk (step 222), the bandwidth required for the operation is calculated from the corresponding set of parameters in the queue (step 224), if necessary, and the read operation for ReplicatedOp is returned for the select disk (step 226).

Referring again to step 214, if the ReplicatedOp is a write operation, then it is determined, at step 228, whether a file can be written to each of the three disks. When the possible disks are not equal to the available disks (step 228), then the process returns to step 202 and selects another candidate "DiskOp" at step 204. When, on the other hand, the possible disks are equal to the available disks, then the process continues through step 220, to determine if any of the disks are null, and through steps 222, 224 and 226, to perform write operations on each of the three disks.

Referring again to step 212, if candidate DiskOp does not equal ReplicatedOp, then it is determined, at step 230, whether available disk(s) equals super disk. Provided available disk(s) does not equal super disk, then the process returns to step 202 and selects another candidate "DiskOp" at step 204. When available disk(s) equals super disk, then the process continues through step 220, to determine if any of the disks are null, and through steps 222, 224 and 226, to perform a designated superdisk operation, i.e. to read or write preselected segments of information from each of the disks.

Referring to FIGS. 9 and 13–15, the operation of the scheduler 162 is discussed in further detail. Referring specifically to FIGS. 9 and 13, the scheduling of the transfers designated in queue 164 as $X_1$, $Y_1$ and $Z_1$ are scheduled across disks 90-1 (disk 0), 90-2 (disk1) and 90-3 (disk 2) as "CurrentOp1", CurrentOp2" and "CurrentOp3". That is, transfer "$X_1$", having respective start and end times of "$t_{SX1}$" and "$t_{DX1}$", is scheduled on disk 0, transfer "$Y_1$", having respective start and end times of "$t_{SY1}$" and "$t_{DY1}$", is scheduled on disk 1 and transfer "$Z_1$", having respective start and end times of "$t_{SZ1}$" and "$t_{DZ1}$" is scheduled on disk 2. Subsequently, three more transfers, namely $X_2$, $Y_2$ and $Z_2$ are scheduled on disks 0, 1 and 2, respectively. As illustrated in FIG. 13, the time intervals for the transfers $X_2$, $Y_2$ and $Z_2$ are designated as "NextOp1", "NextOp2" and "NextOp3", respectively.

Design of the printing system 2 dictates that each CurrentOp be spaced, in time, from the corresponding "NextOp". This spacing, however, tends to reduce the combined bandwidth of the disks 90. It has been found that bandwidth can be maximized by inserting a transfer, namely an "InsertOp" (designated by the letter "I" in queue 164 of FIG. 9), between a given set of CurrentOp and NextOp. By maximizing the combined bandwidth of the disks, clients of the printing system 2 are better served and operation of the printing system 2 is optimized. Before proceeding to the optimization scheme of FIGS. 14 and 15, a few comments regarding FIG. 13 are in order. When InsertOp is scheduled between CurrentOp and NextOp, an initial seek time is required to move a disk head from the location at which the CurrentOp is ended and the InsertOp is started. Additionally, a final seek time is required to move the disk head from the location at which the InsertOp is ended and the NextOp is started.

It has also been found that, in one example, even when InsertOp can be performed on any one of the three disks, as shown in FIG. 13, bandwidth is maximized when InsertOp is scheduled on a particular one of the disks. As will appear, inserting InsertOp to maximize bandwidth is not necessarily a straightforward process. In particular, referring still to the example of FIG. 13, scheduling InsertOp on the disk in which CurrentOp has the shortest time interval, namely disk 2, does not necessarily result in an earliest end time, i.e. an "EET". Moreover, scheduling InsertOp on the disk in which the combined seek time has the shortest time interval, namely disk 1, does not necessarily result in the EET. Indeed, it may be that neither the disk with the shortest CurrentOp time interval, namely disk 2, nor the disk with the shortest combined seek time interval, namely disk 1, possesses the EET. Without some sort of suitable software to determine EET, it would not necessarily be apparent that, in the example of FIG. 13, disk 0 actually possesses the EET.

Referring to FIGS. 9 and 14-15, the optimization scheme or technique for determining EET is described in further detail. The example of FIGS. 14-15 is intended to apply specifically to at least three types of insertions. First a replicated read operation can be inserted among other replicated read operations. Second, a superdisk read operation can be inserted among other superdisk read operations. Finally, a super disk write operation can be inserted among other super disk write operations. It will be appreciated by those skilled in the art, however, that various other types of insertions are contemplated by the present technique. It should also be appreciated that the present technique is based on two simplifying assumptions, the assumptions being helpful, but not essential for the successful implementation of the technique. First, a superdisk operation occurs on all three disks simultaneously. Second, the operations are sorted in the queue 164 so that superdisk operations, which tend to comprise image files, are performed prior to replicated operations.

At step 230 (FIG. 14), a starting point is found in the queue 164, and, at step 232, a target disk(s) is determined. Throughout the present discussion of FIGS. 14-15, certain steps will be discussed in the context of inserting a replicated operation between two replicated operations on a single disk and other steps will be discussed in the context of inserting a super disk operation between two super disk operations, i.e. inserting three segments across three disks, respectively. It will be appreciated by those skilled in the art that the flow diagram of FIGS. 14-15 is applicable, as a minimum, to both contexts.

Using the target disk, NextOp is found. At step 236, a gap time interval between CurrentOp and NextOp ("$t_{GAP}$") is calculated, and, at step 238, $t_{GAP}$ is compared with the time interval of InsertOp ("$t_I$"). If $t_{GAP}$ is less than $t_I$, then the process proceeds to step 256, the significance of which step will be discussed in further detail below. Provided that $t_{GAP}$ is greater than or equal to $t_I$, then the total seek time ("$t_{INITIAL\ SEEK} + t_{FINAL\ SEEK}$") ($t_{TOTAL\ SEEK}$) is calculated at step 248. If $t_{GAP}$ is less than the sum of both $t_I$ and $t_{TOTAL\ SEEK}$ ("$t_{SUM}$"), as determined at step 250, then the process proceeds to step 256. When, however, the gap is greater than or equal to $t_{SUM}$, then $t_{SUM}$ is, via step 252, compared to the current value of EET. In the preferred embodiment, EET is initialized at a relatively high, arbitrary value. Hence for an initial pass through the the flow diagram of FIGS. 14-15, the process proceeds to step 254. For subsequent passes, if $t_{SUM}$ is less than EET, then the process proceeds to step 256. Provided that $t_{SUM}$ is greater than or equal to the current value of EET, then EET assumes the current value of $t_{SUM}$ and an insert point for InsertOp is set at the end of CurrentOp.

At step 256, it is determined whether InsertOp is a replicated operation or a super disk operation. If InsertOp is a super disk operation, then it is presumed that three transfers are scheduled on the disks 0, 1 and 2, respectively, and another operation is fetched, via step 258, from the queue 164. Provided, that InsertOp is a replicated operation, then it is determined, at step 260, whether the CurrentOp is a replicated operation or a super disk operation. If the CurrentOp is a replicated operation then the process proceeds to step 258. If, on the other hand, the CurrentOp is a super disk operation, then step 262 is used to insure that each of the disks 0, 1 and 2 have been considered appropriately. That is the process does not proceed to step 258 until the target disk assumes the value of the "last" disk.

In any event, the process proceeds to step 266, where CurrentOp is assigned the value of NextOp, and then to step 268 where the disk(s) is examined to determine if CurrentOp is null. If CurrentOp is null, then the process proceeds to EXIT, and if CurrentOp is not null then the moment at which CurrentOp begins is checked at step 270. When CurrentOp starts after EET, the process proceeds to EXIT; otherwise the process loops back to step 232 and continues until the optimum EET is found.

Numerous features of the present invention will be appreciated by those skilled in the art. One feature of the present invention is that operations can be scheduled in a manner which maximizes combined bandwidth of a plurality of disk drive devices. The printing of files is facilitated by maximizing the combined bandwidth, and service to clients having nonguaranteed bandwidth is optimized. Another feature of the present invention is that the plurality of disk drive devices is kept as busy as possible. That is operations are dispatched continuously to respective disk drive devices unless all of the disk drive devices are busy or a group of operations cannot be performed because a plurality of the disk drive devices is not available. Yet another feature of the present invention is that flexible scheduling and dispatching techniques, which are suitable for use with both replicated and super disk files, are provided. For example, in accordance with these techniques, a plurality of operations can be dispatched to or scheduled on a plurality of disk drive devices simultaneously.

What is claimed is:

1. A printing machine for printing image data from one of a plurality of image files, comprising:

an image input source for providing the plurality of image files;

a system memory, communicating with said image input source, being adapted to store selected image data temporarily and sets of parameters;

a disk device, communicating with said system memory, for storing the image data of the image files;

the plurality of image files including:

a first image file including a first set of image data and being associated with a first set of parameters, the first set of parameters indicating a first transfer time interval defining a time interval required to transfer the first set of image data between said disk device and said system memory, the first transfer time interval being characterized, in the first set of parameters, by a start time and an end time, a second image file including a second set of image data and being associated with a second set of parameters, the second set of parameters indicating a second transfer time interval defining a time interval required to transfer the second set of image data between said disk device and said system memory, the second transfer time interval being characterized, in the second set of parameters, by a start time and an end time, and a third image file including a third set of image data and being associated with a third set of parameters, the third set of parameters indicating a third transfer time interval defining a time interval required to transfer the third set of image data between said disk device and said system memory;

a resource manager for controlling and scheduling the transfer of the first set of image data between said disk device and said system memory and the transfer of the second set of image data between said disk device and said system memory, said resource manager scheduling the transfer of the third set of image data, between said disk device and said system memory, to occur, after the end time of the first transfer time interval and before the start time of the second transfer time interval when the third transfer time interval is less than a time interval defined by a time difference between the end time of the second transfer time interval and the start time of the second transfer time interval.

2. The printing machine of claim 1, wherein each of said first, second and third sets of parameters are ordered in one or more queues.

3. The printing machine of claim 1, wherein said image input source comprises a scanning device for generating the image data of the plurality of image files.

4. The printing machine of claim 1, further comprising a printing device, communicating with said disk device, for printing image data associated with a selected one of said first second and third image files.

5. A method for scheduling transfer operations in a printing machine having a scheduler communicating with a disk device, each transfer operation being associated with transmitting image data between the disk device and a system memory so that the image data is communicated to a selected one of a plurality of services associated with the printing machine, comprising the steps of:

a) scheduling, with the scheduler, a first transfer operation to be performed, with a first set of image data disposed at a first location of the disk device, during a first time interval and a second transfer operation to be performed, with a second set of image data disposed at a second location of the disk device, during a second time interval so that a time gap interval exists between the first time interval and the second time interval;

b) determining a time interval corresponding with the time clap interval; and c) scheduling, with the scheduler, a third transfer operation to be performed, with a third set of image data disposed at a third location of the disk device, during a third time interval when the third time interval is less than the time interval corresponding with the time clap interval, the third interval occurring, if at all, after the first transfer operation and prior to the second transfer operation.

6. The method of claim 5, wherein step c) includes the step of obtaining a quantitative indication of the time interval corresponding with the time gap interval by summing the following:

1) a first seek time required to move a disk head along the disk device from a first location on the disk device to a third location,
2) the third time interval, and
3) a second seek time required to move the disk head along the disk device from the third location to a second location on the disk device.

7. A method for processing a file of data in an electroreprographic machine of the type having an input/output device communicating with a selected one of a plurality of disks by way of a system memory, each file having a set of parameters designating a transfer to be performed with the file and a selected one of the plurality of disks, each set of parameters being disposed in one of a plurality of disk queues, comprising the steps of:

a) selecting one of the sets of parameters from one of the disk queues for designating a transfer to be performed between a selected one of the plurality of disks and the system memory;
b) determining whether the designated transfer can be performed with a selected one of the disks, wherein said step b) includes determining whether the designated transfer is associated with a file which is replicated on each of the plurality of disks or a file which includes a series of segments distributed across the plurality of disks; and
c) dispatching the designated transfer to the selected one of the disks of said step b) when it is determined that the designated transfer can be performed therewith.

8. The method of claim 7, further comprising the steps of:

d) selecting another one of the sets of parameters from one of the disk queues for designating another transfer to be performed with a selected one of the plurality of disks; and
e) repeating steps b) through d) for each of the sets of parameters in the plurality of disk queues.

9. The method of claim 7, in which the file is replicated on each of the disks and the designated transfer is a write operation, wherein:

said determining step comprises determining whether a write operation can be performed on each of the disks; and
said dispatching step comprises writing the file copies to the plurality of disks, respectively, when it is determined that the write operations can be performed on respective disks.

10. The method of claim 5, in which the printing machine includes a second disk device, further comprising the steps of:

d) scheduling, with the scheduler, a fourth transfer operation to be performed, with a fourth set of image data disposed at a first location of the second disk device, during a time interval, and a fifth transfer operation to be performed, with a fifth set of image data disposed at a second location of the second disk device, during a fifth time interval, so that a second time gap interval exists between the fourth time interval and the fifth time interval;

e) determining a time interval corresponding with the second time gap interval; and f) scheduling, with the scheduler, the third transfer operation to be performed, with the third set of image data disposed at a third location of the second disk device, during the third time interval when the third time interval is less than the time interval corresponding with the second time gap interval, the third time interval occurring, if at all, after the fourth transfer operation and prior to the fifth transfer operation.

* * * * *